US012737321B1

(12) United States Patent
Appel et al.

(10) Patent No.: US 12,737,321 B1
(45) Date of Patent: Sep. 15, 2026

(54) PROCESSING FOLDER EXTRACTING AND SUMMARIZING CONTENT

(71) Applicant: International Business Machines Corporation, Armonk, NY (US)

(72) Inventors: Ana Paula Appel, São Paulo (BR); Hector Paoletti Galvao Barbosa, São Paulo (BR); Andre Felipe P Lopes, Jacarei (BR); Enio Jose Moura, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/187,259

(22) Filed: Apr. 23, 2025

(51) Int. Cl.
*G06F 16/48* (2019.01)
*G06F 16/11* (2019.01)

(52) U.S. Cl.
CPC ............ *G06F 16/122* (2019.01); *G06F 16/48* (2019.01)

(58) Field of Classification Search
CPC ........ G06F 16/122; G06F 16/48; G06F 16/40; G06F 16/43
See application file for complete search history.

(56) References Cited

U.S. PATENT DOCUMENTS 7,823,055 B2 10/2010 Sull et al.
10,872,122 B2 12/2020 Elliott et al.
11,307,667 B2 4/2022 Banerjee et al.
11,494,561 B2 11/2022 Shazeer et al.
2015/0169758 A1* 6/2015 Assom .................... G06F 16/36 707/603
2018/0091873 A1* 3/2018 Navin ..................... G06F 16/40
2020/0258420 A1 8/2020 Kurani
2021/0142690 A1 5/2021 Wenger et al.
2022/0005368 A1 1/2022 Trim et al.
2022/0237368 A1* 7/2022 Tran ........................ G06F 21/32
2022/0246052 A1 8/2022 Smith Lewis et al.
2022/0374605 A1* 11/2022 Sethi ..................... G06F 1/3209
2022/0415200 A1 12/2022 Venkatasubramanyam
2024/0289863 A1* 8/2024 Smith Lewis ......... G06N 3/008
(Continued)

FOREIGN PATENT DOCUMENTS

WO 2022/147359 A1 7/2022

*Primary Examiner* — Merilyn P Nguyen
(74) *Attorney, Agent, or Firm* — Amin, Turocy & Watson, LLP

(57) ABSTRACT

A system includes a processor that executes computer executable components stored in a memory. The computer executable components can comprise a user input component that receives user input pertaining to a subject; a collection component that obtains media files pertaining to the subject populates a knowledge base with the obtained files; an extraction component that determined a media type for each obtained file and extracts relevant features and metadata; an analysis component that utilizes a large language model to extract key information from the obtained files; a categorization component that categorizes and tags the files; a summarization component that generates a summary of each file; a generation component that determines a chronological order of the obtained files to be reviewed by a user and generates a graph displaying the determined chronological order; and a feedback component that receives feedback from a user and updates the determined chronological order and graph.

20 Claims, 5 Drawing Sheets

(56) References Cited

U.S. PATENT DOCUMENTS

| | | | | |
|---|---|---|---|---|
| 2024/0412654 | A1 | 12/2024 | Olla | |
| 2025/0139468 | A1* | 5/2025 | Taylor | H04N 21/85 |
| 2026/0011149 | A1* | 1/2026 | Lakhotia | G06V 20/44 |
| 2026/0064746 | A1* | 3/2026 | Zhang | G06F 16/24575 |

* cited by examiner

PROCESSING FOLDER EXTRACTING AND SUMMARIZING CONTENT

BACKGROUND

The subject disclosure relates to folder extraction and content summarization, e.g., automated learning plan creation using multi-modal materials.

In today's digital age, the internet has become an indispensable resource for learning, providing access to an immense volume of educational content, including articles, videos, podcasts, research papers, and more. While this wealth of information is beneficial, it also presents significant challenges to individuals trying to learn more about topics of interest. M ore particularly, users can find it overwhelming to navigate through disparate resources and create an effective learning plan. The process of manually gathering relevant materials, extracting key information, and determining the most efficient sequence for studying can be both time-consuming and prone to errors.

One of the primary difficulties learners face is the lack of a structured approach to synthesizing information from various sources. Manually curating study materials requires significant effort, and without systematic guidance, learners may inadvertently overlook important concepts or fail to identify dependencies between topics. Additionally, the absence of a clear pathway makes it challenging to address knowledge gaps, ultimately hindering the learning process.

Thus, there is a need for improved systems and methods that can accurately collect and analyze learning materials and organize them into a coherent, user-friendly learning plan, specifically tailored to a user's needs and preferences.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate automated learning plan creation using multi-modal materials are provided.

According to an embodiment, a system can comprise a processor that executes computer executable components stored in memory. The computer executable components can comprise a user input component that receives input from a user pertaining to a subject of interest. The computer executable components can further comprise a collection component that obtains media files pertaining to the subject of interest for the user, and populates a knowledge base with the obtained files. The computer executable components can further comprise an extraction component that determined a type of media for each of the obtained files and extracts relevant features and metadata from each of the files, based on the determined media type of the file. The computer executable components can further comprise an analysis component that utilizes a large language model to extract key information from the obtained files. The computer executable components can further comprise a categorization component that categorizes and tags the files based on complexity, length, or target audience of the files. The computer executable components can further comprise a summarization component that generates a summary of each file, based on the extract key information. The computer executable components can further comprise a generation component that determines a chronological order of the obtained files to be reviewed by a user, based on the generated summary and extracted key information, and generates a graph displaying the determined chronological order. The computer executable components can further comprise a feedback component that receives feedback from a user and updates the determined chronological order and graph, based on the received feedback.

According to another embodiment, a computer-implemented method can comprise receiving, by a system operatively coupled to a processor, input from a user pertaining to a subject of interest. The computer-implemented method can comprise obtaining, by the system, media files pertaining to the subject of interest. The computer-implemented method can comprise populating, by the system, a knowledge base with the obtained files. The computer-implemented method can comprise determining, by the system, a type of media for each of the obtained files. The computer-implemented method can comprise extracting, by the system, relevant features and metadata from each of the files, based on the determined media type of the file. The computer-implemented method can comprise utilizing, by the system, a large language model to extract key information from the obtained files. The computer-implemented method can comprise categorizing, by the system, and tagging the files based on complexity, length, or target audience of the files. The computer-implemented method can comprise summarizing, by the system, of each file, based on the extract key information. The computer-implemented method can comprise determining, by the system, a chronological order of the obtained files to be reviewed by a user, based on the generated summary and extracted key information. The computer-implemented method can comprise generating, by the system, a graph displaying the determined chronological order. The computer-implemented method can comprise receiving, by the system, feedback from a user. The computer-implemented method can comprise updating, by the system, the determined chronological order and graph, based on the received feedback.

According to another embodiment, a computer program product comprising a computer readable storage medium having program instructions embodied therewith, the program instructions executable by a processor to cause the processor to receive, by the processor, input from a user pertaining to a subject of interest. The program instructions can also cause the processor to obtain, by the processor, media files pertaining to the subject of interest. The program instructions can also cause the processor to populate, by the processor, a knowledge base with the obtained files. The program instructions can also cause the processor to determine, by the processor, a type of media for each of the obtained files. The program instructions can also cause the processor to extract, by the processor, relevant features and metadata from each of the files, based on the determined media type of the file. The program instructions can also cause the processor to utilize, by the processor, a large language model to extract key information from the obtained files. The program instructions can also cause the processor to categorize, by the processor, and tag, by the processor, the files based on complexity, length, or target audience of the files. The program instructions can also cause the processor to summarize, by the processor, each file, based on the extract key information. The program instructions can also cause the processor to determine, by the processor, a chronological order of the obtained files to be reviewed by a user, based on the generated summary and extracted key information. The program instructions can also cause the processor to generate, by the processor, a graph displaying the determined chronological order. The program instructions can also cause the processor to receive, by the processor, feedback from a user. The program instructions can also cause the processor to update, by the processor, the determined chronological order and graph, based on the received feedback.

DETAILED DESCRIPTION

Figure 1:
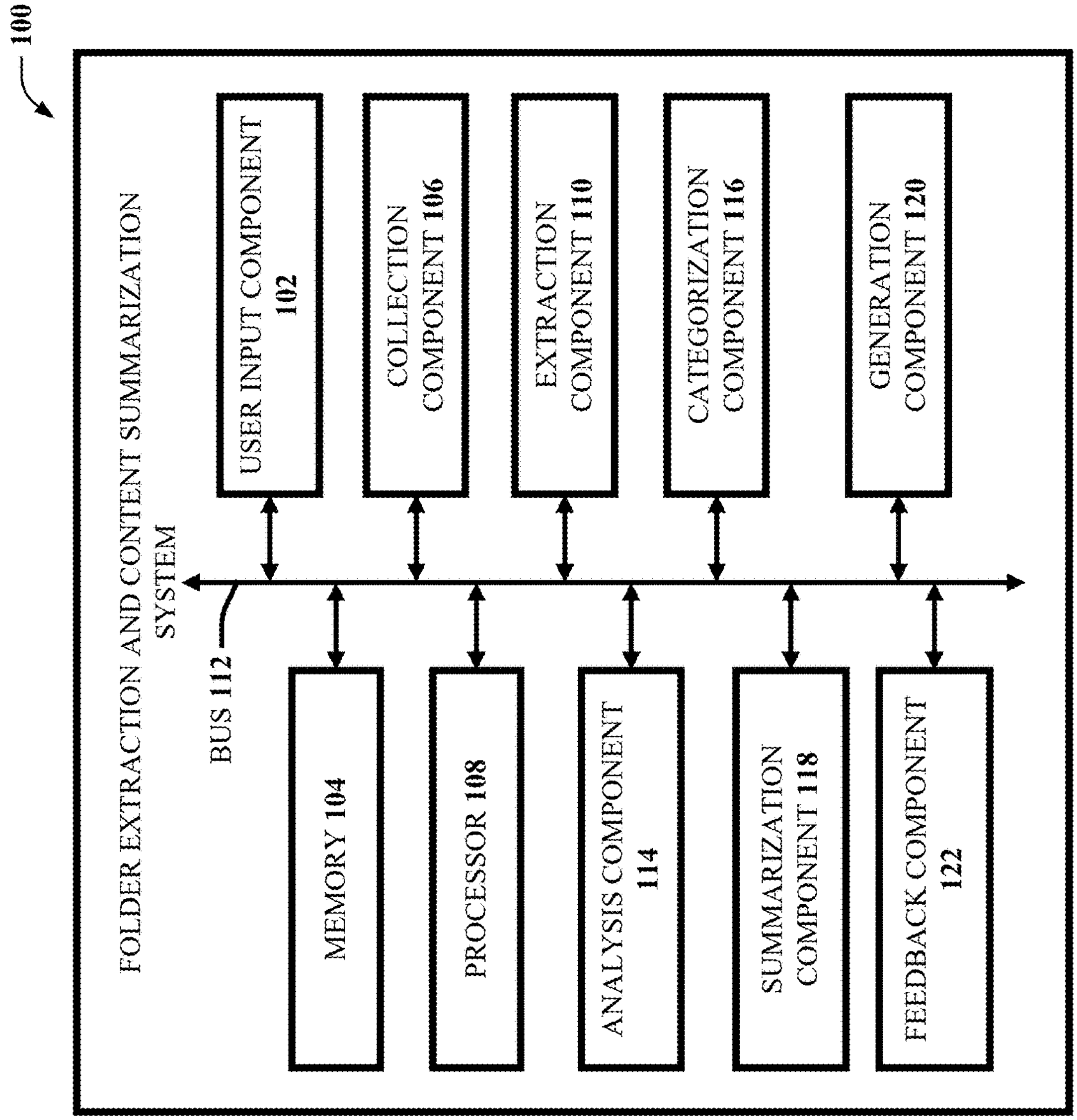
FIG. 1 illustrates an example system that can facilitate automated learning plan creation using multi-modal materials in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

In today's rapidly evolving digital landscape, access to a vast array of educational resources on the internet has transformed the way individuals acquire new skills and knowledge. However, the abundance of information also poses significant challenges. Learners often struggle to effectively gather, analyze, and organize relevant materials into a coherent and efficient learning plan. The manual curation of study resources is not only time-consuming but also prone to errors, leading to fragmented and inefficient learning experiences. Furthermore, existing educational solutions typically focus on narrow applications, such as teaching specific subjects or performing isolated tasks like summarization, rather than providing a holistic and adaptable framework for personalized learning.

In relation to facilitate automated learning plan creation using multi-modal materials, embodiments of the present disclosure produce a solution to one or more of these problems. M ore specifically, the disclosed invention addresses these challenges by introducing a system that can integrate advanced machine learning techniques, feature engineering, and user feedback mechanisms to create a highly adaptive and personalized learning experience. By employing feature engineering, the system can extract relevant features from diverse media types, including text, images, audio, and video. The presently disclosed system can utilize a large multi-modal model to analyze the content and extract key information, topics, and/or entities. The system's categorization and/or tagging components can classify the files based on complexity, length, and target audience, allowing users to navigate the content efficiently. Additionally, the system can generate summaries of each file and determine an optimal chronological order for consumption, visualized through an interactive graph-based dashboard.

A key innovation of the presently disclosed solution is the ability to continuously adapt to a user's preferences and progress. The integration of a feedback component allows the system to receive user inputs, such as ratings and comments, which can be utilized to update the chronological learning path in real-time. By employing reinforcement learning techniques, the system can dynamically adjust to maximize user engagement and learning outcomes. Unlike conventional systems that offer rigid and limited educational pathways, the presently disclosed solution empowers users with a flexible, customizable learning environment. The disclosed invention can democratize access to high-quality educational resources, enhance workforce competitiveness, and promote social mobility by enabling individuals to systematically build on their existing knowledge and skills.

The presently disclosed solution can facilitate an efficient and structured learning process by utilizing a systematic approach to collecting, processing, and organizing educational content. The process can begin with collecting relevant documents and media from various online sources. The user can gather a wide range of materials related to the topic of interest, including text files, images, audio recordings, videos, and other multimedia content. These collected materials can then be stored in a designated folder, which can serve as the knowledge base for the specific subject. This folder can act as a centralized repository, making it convenient for the system to access and process the collected resources.

Once the materials are organized within the knowledge base, the system can initiate the feature engineering process. This process can involve analyzing each document and media file based on its type to extract meaningful features. For instance, text documents can be processed to extract features like bag-of-words representations and sentiment analysis. Similarly, images can be processed for object detection and classification, while audio files can undergo speech recognition and audio classification. The system can also perform necessary transformations such as text preprocessing, image resizing, and audio noise reduction to ensure that the extracted features are accurate and reliable. Additionally, the system can extract metadata, such as the creation date and author information, to provide contextual details for each file.

After feature extraction, the system can employ a Large Multi-Modal Model (LLM) to analyze the collected media. The LLM model can extract key information, including summarizations, entities, and topics, from each document, allowing the system to gain a comprehensive understanding of the content and identify the most important concepts and relationships within the materials. Based on the analysis, the system can categorize and tag the media files according to various parameters, such as complexity, length, and intended audience. Labels like "technical" or "simple", "long" or "short", and "general" or "specific" can be assigned to each file. These categorizations can allow the system to generate personalized learning paths that suit the user's learning style and objectives. Additionally, the system can generate summaries for each file, offering concise overviews of the main concepts and ideas extracted during the analysis phase.

These summaries can assist users in quickly grasping the core content and contextual relationships among different materials.

The system can generate a graph that displays an optimal chronological order for consuming the collected materials. This graph, which can consider factors such as document citations, difficulty, and publication date, can be represented as an interactive map-like dashboard. Users can visually explore the recommended learning sequence, enabling a more structured and efficient learning experience. The system can also incorporate a continuous feedback loop, allowing users to provide input such as ratings and comments. By utilizing reinforcement learning techniques, the system can adapt in real time, adjusting the learning path to maximize user engagement and educational outcomes. To efficiently store the processed information, the system can utilize a vector database, which can allow for fast querying and retrieval, maintaining an adaptive and scalable learning environment.

According to an embodiment, a system can include a processor that executes computer executable components stored in memory. The computer executable components can comprise a user input component that receives input from a user pertaining to a subject of interest. The computer executable components can further comprise a collection component that obtains media files pertaining to the subject of interest for the user, and populates a knowledge base with the obtained files. The computer executable components can further comprise an extraction component that determined a type of media for each of the obtained files and extracts relevant features and metadata from each of the files, based on the determined media type of the file. The computer executable components can further comprise an analysis component that utilizes a large language model to extract key information from the obtained files. The computer executable components can further comprise a categorization component that categorizes and tags the files based on complexity, length, or target audience of the files. The computer executable components can further comprise a summarization component that generates a summary of each file, based on the extract key information. The computer executable components can further comprise a generation component that determines a chronological order of the obtained files to be reviewed by a user, based on the generated summary and extracted key information, and generates a graph displaying the determined chronological order. The computer executable components can further comprise a feedback component that receives feedback from a user and updates the determined chronological order and graph, based on the received feedback.

In some embodiments, the media can further comprise at least one of documents, text, images, audio, or video.

In various embodiments the extraction component can utilize a feature engineering module to extract features specific to the type of media. The extraction component can extract bag-of-words representation and sentiment analysis for text documents, object detection and classification for images, or speech recognition and audio classification for audio files. The extraction component can apply text preprocessing, image resizing, or audio noise reduction to improve accuracy and reliability of extracted features.

According to some embodiments, the analysis component can employ a large multi-modal model trained on diverse data sources to extract summarizations, entities, and topics from the obtained media files. The analysis component can use the extracted entities and topics to determine relationships between the media files.

In some embodiments, the categorization component can assign metadata-based labels to the media files. The metadata-based labels can further comprise a complexity level, a length, or a target audience. Additionally, the metadata can further comprise a creation date, author, or reference to related materials.

In various embodiments, the generation component can further determine the chronological order of files based on a document citation, difficulty level, or publication time of a file.

In some embodiments, the feedback component can collect user input in the form of ratings, comments, or interaction metrics to refine the chronological order, and can update the knowledge base based on the collected user input. The feedback component can employ reinforcement learning techniques to optimize the chronological order based on user engagement or learning outcomes.

In various embodiments, the system can further comprise a data component that can utilize a vector database to store embeddings of extracted features, metadata, or user interactions.

In some embodiments, the system can further comprise an artificial intelligence component that can analyze progress of a user and can update the chronological order based on the user progress.

FIG. 1 illustrates an example system 100 for facilitating automated learning plan creation using multi-modal materials. The system 100 uses a user input component 102, a collection component 106, an extraction component 110, an analysis component 114, a categorization component 116, a summarization component 118, a generation component 120, and a feedback component 122.

The user input component can receive input from a user pertaining to a subject of interest. The collection component can obtain media files pertaining to the subject of interest for the user, and can populate a knowledge base with the obtained files. The extraction component can determine a type of media for each of the obtained files and can extract relevant features and metadata from each of the files, based on the determined media type of the file. The analysis component can utilize a large language model to extract key information from the obtained files. The categorization component can categorize and tag the files based on complexity, length, or target audience of the files. The summarization component can generate a summary of each file, based on the extract key information. The generation component can determine a chronological order of the obtained files to be reviewed by a user, based on the generated summary and extracted key information, and can generate a graph displaying the determined chronological order. The feedback component can receive feedback from a user and can update the determined chronological order and graph, based on the received feedback.

Aspects of systems (e.g., systems 100, 200, and the like), apparatuses, or processes in various embodiments of the present disclosure can constitute one or more machine-executable components embodied within one or more machines. For example, the components may be embodied in one or more computer readable mediums (or media) associated with one or more machines. Such components, when executed by the one or more machines (e.g., computers, computing devices, virtual machines, etc.) can cause the machines to perform the operations described. System 100 can comprise a user input component 102, a memory 104, a collection component 106, a processor 108, an extraction component 110, a system bus 112, an analysis component

114, a categorization component 116, a summarization component 118, generation component 120, and a feedback component 122.

The system 100 and/or the components of the system 100 may use hardware and/or software to solve problems that are highly technical in nature. The system 100 solves problems that are not abstract and that cannot be performed as a set of mental acts by a human. Further, some of the processes can be performed by specialized computers for carrying out defined tasks related to automated learning plan creation using multi-modal materials. The system 100 and/or components of the system 100 can be employed to solve new problems that arise through advancements in technologies. The system 100 can provide technical improvements to automated learning plan creation using multi-modal materials by leveraging advanced machine learning techniques, including feature engineering and large multi-modal model analysis, to extract relevant features and key information from diverse media types. Additionally, the system 100 can utilize adaptive algorithms, including reinforcement learning, to continuously refine and optimize the learning sequence based on user feedback. By efficiently organizing and categorizing media files and generating an interactive, graph-based chronological learning plan, the system 100 can enhance the accuracy, relevance, and personalization of educational content delivery.

The system 100 can include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that may be operably connected to the processor 108. The memory 104 can store computer-executable instructions that, upon execution by the processor 108, can cause the processor 108 and/or one or more other components of the system 100 (e.g., the user input component 102, the collection component 106, the extraction component 110, the analysis component 114, the categorization component 116, the summarization component 118, the generation component 120, and/or the feedback component 122) to perform one or more actions. In some embodiments, the memory 104 can store computer-executable components (e.g., the user input component 102, the collection component 106, the extraction component 110, the analysis component 114, the categorization component 116, the summarization component 118, the generation component 120, and/or the feedback component 122).

The system 100 and/or a component thereof as described herein can be communicatively, electrically, operatively, optically, and/or otherwise coupled to one another via a bus 112. The bus 112 can include one or more of a memory bus, memory controller, peripheral bus, external bus, local bus, and/or another type of bus that may employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In various embodiments, the user input component can receive input from a user pertaining to a subject of interest. The user input component 102 can allow users to specify topics, keywords, or areas of focus that they wish to explore. This input can guide the system in collecting and organizing relevant media files related to the specified subject. The user input component 102 can be designed to accommodate various forms of input, including textual entries, voice commands, or selections from predefined categories. In some embodiments, the user can provide the relevant documents and media directly to the user input component 102. The input component 102 can then download the provided materials to a designated folder, which can serve as the knowledge base for the specific subject. The folder can be prepared and organized by the input component 102, acting as the central repository for all the gathered materials, making them easy to access and process. The media can further comprise documents, text, images, audio, video, or any other form of suitable media.

According to some embodiments, the collection component 106 can obtain media files pertaining to the subject of interest for the user. The collection component 106 can be configured to access various sources of digital content, including the internet, databases, and local storage, to retrieve relevant materials that align with the specified subject. The collection component 106 can work in coordination with the user input component 102 to ensure that the obtained files accurately reflect the user's preferences and learning objectives. The media can further comprise documents, text, images, audio, video, or any other form of suitable media. Once the media files are obtained, the collection component 106 can populate a knowledge base with the retrieved files. This knowledge base can serve as a structured repository that organizes the collected media in a systematic manner, facilitating easy access and processing in subsequent stages. The collection component 106 can ensure that the knowledge base is continuously updated as new materials are obtained, maintaining an up-to-date and comprehensive repository for the learning plan.

According to some embodiments, the extraction component 110 can determine a type of media for each of the obtained files. The extraction component 110 can analyze the format, structure, and content of each file to accurately identify whether the file is a text document, image, audio file, video, or other media type. Once the media type is determined, the extraction component 110 can extract relevant features and metadata from each file based on its identified type. The extraction component 110 can utilize a feature engineering module to perform this task. For text documents, the extraction component 110 can extract features such as bag-of-words representation and perform sentiment analysis. For image files, the extraction component 110 can extract features related to object detection and classification. In the case of audio files, the extraction component 110 can apply speech recognition and audio classification to extract meaningful auditory features. To further enhance the quality of the extracted features, the extraction component 110 can apply various preprocessing techniques tailored to each media type. These techniques can include text preprocessing to remove noise and standardize text formats, image resizing to maintain consistency, and audio noise reduction to improve sound clarity.

According to some embodiments, the analysis component 114 can utilize a large language model to extract key information from the obtained files. The analysis component 114 can be configured to process diverse types of media files, leveraging advanced machine learning techniques to gain insights from the collected content. By employing a large multi-modal model trained on a wide range of data sources, the analysis component 114 can extract summarizations, entities, and topics from the obtained media files. The analysis component 114 can further use the extracted entities and topics to determine relationships between the media files. By identifying connections such as common themes, overlapping topics, or referenced concepts, the analysis component 114 can construct a more structured and interconnected understanding of the learning materials.

In certain embodiments, the categorization component 116 can categorize and tag the files based on the complexity, length, or target audience of the files. The categorization component 116 can be configured to analyze the extracted metadata and content features to assign appropriate labels to each media file. These labels can include metadata-based identifiers that reflect key attributes of the files. The metadata-based labels assigned by the categorization component 116 can include indicators of complexity level, such as "basic," "intermediate," or "advanced," to help users identify the difficulty of the content. The labels can also reflect the length of the material, categorizing files as "short," "medium," or "long" based on word count, duration, or file size. Additionally, the categorization component 116 can tag files according to the target audience, such as "general," "technical," or "academic." The metadata used for categorization can further include specific contextual information, such as the creation date of the file, the author or creator, and references to related materials.

In some embodiments, the summarization component 118 can generate a summary of each file, based on the extract key information. The summarization component 118 can utilize the insights derived from the analysis component 114, including summarizations, entities, and topics, to create a concise and informative representation of the file's content. This summary can provide a quick overview of the main concepts and ideas presented in the file, enabling the user to understand the core message without having to review the entire content. The summarization component 118 can employ natural language processing techniques and summarization algorithms to ensure that the generated summary captures the most relevant and critical points from the original material.

In various embodiments, the generation component 120 can determine a chronological order of the obtained files to be reviewed by a user, based on the generated summary and extracted key information. The generation component 120 can analyze the content structure and contextual relationships between files to establish a logical and coherent sequence for consumption. This determination can take into account factors such as document citations, difficulty levels, and the publication time of each file, ensuring that the user progresses through the material in an order that supports optimal learning and comprehension. The generation component 120 can further generate a graph that visually displays the determined chronological order. This graph can be represented as an interactive and intuitive dashboard, allowing users to explore the recommended sequence of materials. By presenting the chronological order in a graphical format, the generation component 120 can enhance user engagement and provide a clear visual representation of the learning path.

In some embodiments, the feedback component 122 can receive feedback from a user. The feedback component 122 can be configured to collect various types of user input, including ratings, comments, and interaction metrics, to gain insights into the user's experience and preferences. By capturing feedback related to the chronological order and content quality, the feedback component 122 can facilitate the continuous improvement of the learning plan. The feedback component 122 can utilize the collected input to update the determined chronological order and graph, thereby refining the learning path based on the user's evolving needs and responses. To further optimize the learning experience, the feedback component 122 can employ reinforcement learning techniques. These techniques can include algorithms such as Q-learning or policy gradient methods, which can analyze user engagement and learning outcomes to adjust the order of content presentation.

The systems and/or devices are described herein with respect to interaction between one or more components. Such systems and/or components may include the components and/or sub-components specified therein, one or more of the specified components and/or sub-components, and/or additional components. Sub-components may be implemented as components communicatively coupled to other components rather than included within parent components. One or more components and/or sub-components may be combined into a single component providing aggregate functionality. The components may interact with one or more other components not specifically described herein for the sake of brevity but known by those of skill in the art.

Figure 2:
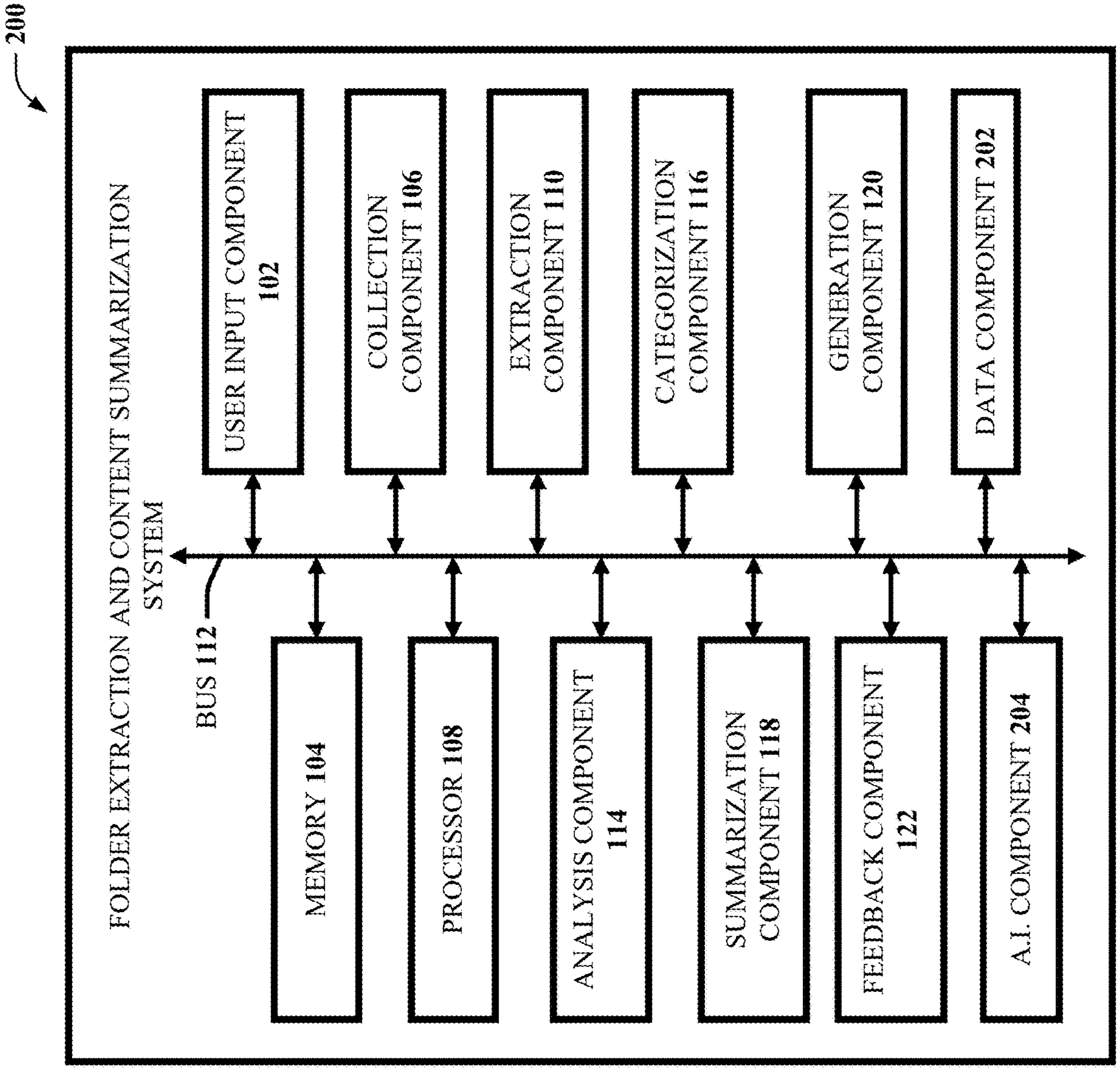
FIG. 2 illustrates an example system that can facilitate automated learning plan creation using multi-modal materials in accordance with some embodiments described herein.

Next, FIG. 2 illustrates an example system 200 for facilitating automated learning plan creation using multimodal materials. The system 200 uses a user input component 102, a collection component 106, an extraction component 110, an analysis component 114, a categorization component 116, a summarization component 118, a generation component 120, a feedback component 122, a data component 202, and an artificial intelligence component 204. The data component 202 can utilize a vector database to store embeddings of extracted features, metadata, or user interactions. The artificial intelligence component 204 can analyze progress of a user and update the chronological order based on the user progress. Description of like components has been omitted for the sake of brevity.

In various embodiments, the data component 202 can utilize a vector database to store embeddings of extracted features, metadata, or user interactions. The vector database can be configured to efficiently manage and organize complex data representations, allowing for rapid querying and retrieval. By storing embeddings, the data component 202 can facilitate the fast and accurate comparison of media files based on their content and contextual relationships. The embeddings stored within the vector database can represent a wide range of information, including features extracted from text, images, audio, and video, as well as metadata such as creation date, author, or related topics. Additionally, the data component 202 can store user interaction data, such as feedback and engagement metrics, enabling the system 200 to adapt and refine the learning path dynamically.

In some embodiments, the artificial intelligence component 204 can analyze progress of a user and update the chronological order based on the user progress. The artificial intelligence component 204 can be configured to monitor various indicators of user engagement and learning outcomes, such as completion rates, time spent on each file, and the accuracy of responses in interactive exercises. By continuously evaluating these metrics, the artificial intelligence component 204 can gain insights into the user's comprehension and mastery of the material. Based on the analysis, the artificial intelligence component 204 can dynamically update the chronological order of the learning plan to better align with the user's current knowledge level and learning pace. This adaptive adjustment can ensure that the most relevant and appropriate content is prioritized, thereby enhancing the overall learning efficiency.

Figure 3:
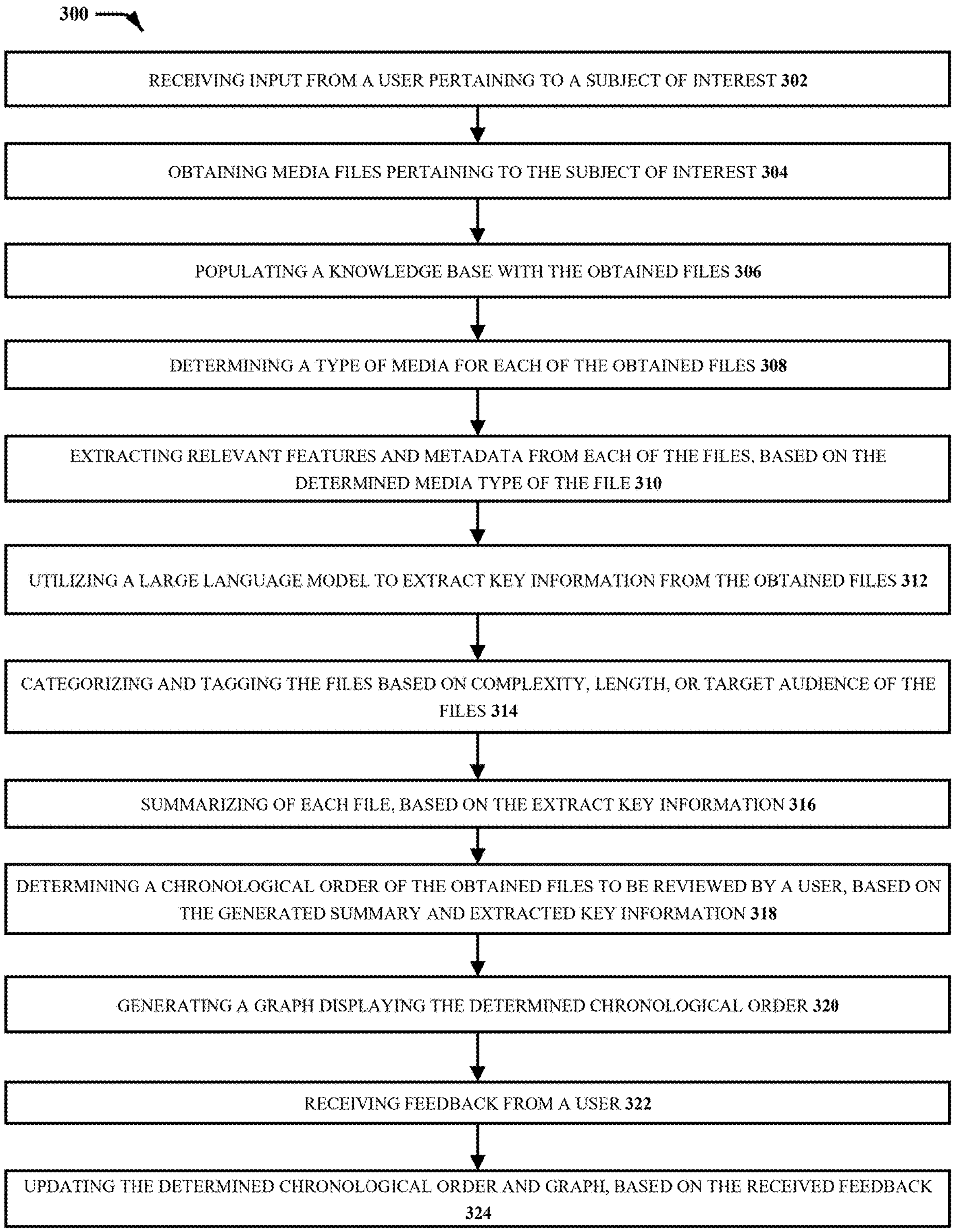
FIG. 3 illustrates a flow diagram of an example computer implemented method that can facilitate automated learning plan creation using multi-modal materials in accordance with some embodiments described herein.

Next, FIG. 3 illustrates a flow diagram of an example computer implemented method 300 that can facilitate automated learning plan creation using multi-modal materials in accordance with some embodiments described herein.

The flow diagram 300 starts by receiving 302 input from a user pertaining to a subject of interest. This step can be performed by prompting the user to specify topics, keywords, or areas they wish to explore. Step 302 can include various forms of input, such as text entry, voice commands, or selection from a list of predefined subjects. The input can guide the system in gathering relevant educational content, thereby aligning the learning plan with the user's specific goals and preferences. The received input can be stored in a temporary memory location for subsequent processing.

The flow diagram 300 continues by obtaining 304 media files pertaining to the subject of interest. This step can involve accessing digital repositories, databases, or online sources to retrieve multimedia content such as text files, images, audio recordings, videos, and more. Step 304 can be performed by the system automatically, or the user can manually upload files directly. The obtained media files can be temporarily stored in a designated folder, which serves as the knowledge base for the subject. The system can verify the integrity and relevance of the collected files before proceeding.

The flow diagram 300 continues by populating 306 a knowledge base with the obtained files. This step can include organizing the media files within a structured directory or database format to facilitate efficient access and processing. The knowledge base can serve as a centralized repository where all collected files are stored, indexed, and cataloged. Step 306 can also involve associating metadata with each file, such as creation date, file type, and source information, to maintain a well-organized data structure.

The flow diagram 300 continues by determining 308 a type of media for each of the obtained files. Step 308 can involve analyzing the file format, extension, and content characteristics to accurately identify whether a file is a text document, image, audio file, video, or another media type. This determination can be crucial for guiding the subsequent feature extraction process. Step 308 can employ media classification algorithms to automatically assign media types based on file properties.

The flow diagram 300 continues by extracting 310 relevant features and metadata from each of the files based on the determined media type. Step 310 can include utilizing a feature engineering module to perform specialized processing. For example, the system can extract bag-of-words representation and sentiment analysis from text documents, object detection and classification from images, or speech recognition and audio classification from audio files. Step 310 can also include performing data transformations, such as text preprocessing, image resizing, or audio noise reduction, to enhance the accuracy of the extracted features.

The flow diagram 300 continues by utilizing 312 a large language model to extract key information from the obtained files. Step 312 can involve applying natural language processing techniques to identify summarizations, entities, and topics within each media item. The large language model can be trained on diverse data sources to ensure comprehensive analysis across different media types. The extracted information can be used to form a deeper understanding of the content and its relationships with other collected materials.

The flow diagram 300 continues by categorizing and tagging 314 the files based on complexity, length, or target audience. Step 314 can include assigning metadata-based labels such as "technical" or "simple" for complexity, "long" or "short" for length, and "general" or "specific" for the target audience. These tags can help structure the learning plan by grouping similar content and enabling personalized recommendations.

The flow diagram 300 continues by summarizing 316 each file based on the extracted key information. Step 316 can include generating concise overviews that highlight the main ideas and core concepts within each media file. The summary can be created using advanced summarization algorithms to ensure clarity and relevance, allowing users to quickly grasp the essence of the material.

The flow diagram 300 continues by determining 318 a chronological order of the obtained files to be reviewed by a user, based on the generated summary and extracted key information. Step 318 can include analyzing factors such as document citations, difficulty levels, and publication time to establish a logical sequence. The ordered list can then serve as the recommended learning path for the user.

The flow diagram 300 continues by generating 320 a graph displaying the determined chronological order. Step 320 can involve creating a visual representation that illustrates the progression through the materials. The graph can be interactive, allowing users to explore the sequence and understand the relationships between files. The graphical layout can enhance user engagement and provide a clear learning roadmap.

The flow diagram 300 continues by receiving 322 feedback from a user. Step 322 can involve collecting user input in the form of ratings, comments, or interaction metrics. This feedback can reflect the user's experience with the presented learning path and can be stored for subsequent analysis.

The flow diagram 300 continues by updating 324 the determined chronological order and graph based on the received feedback. Step 324 can include applying reinforcement learning techniques to optimize the order of content presentation based on user engagement and learning outcomes. The updated sequence can be visually reflected in the graph, providing an improved and adaptive learning experience. By continuously incorporating user feedback, the method 300 can maintain a flexible and personalized approach to structured learning.

The method 300 can include applying text preprocessing, image resizing, or audio noise reduction to improve the accuracy and reliability of the extracted features. These preprocessing techniques can be performed during the feature extraction 310 to ensure that the data is standardized and noise-free, enhancing the system's ability to accurately interpret the content. Text preprocessing can involve removing special characters or normalizing text case, while image resizing can standardize visual inputs, and audio noise reduction can eliminate background disturbances. The method 300 can include utilizing a large language model to extract key information from each media file, including generating summarizations, identifying entities, and detecting topics. The method 300 can further comprise categorizing and tagging the obtained media files by assigning metadata-based labels, which can include indicators such as complexity level, length, or target audience. Summarizing each file can include generating a concise overview of the content by leveraging the key information extracted by the large language model, providing users with quick and informative summaries that aid in understanding the primary concepts of each file.

Figure 4:
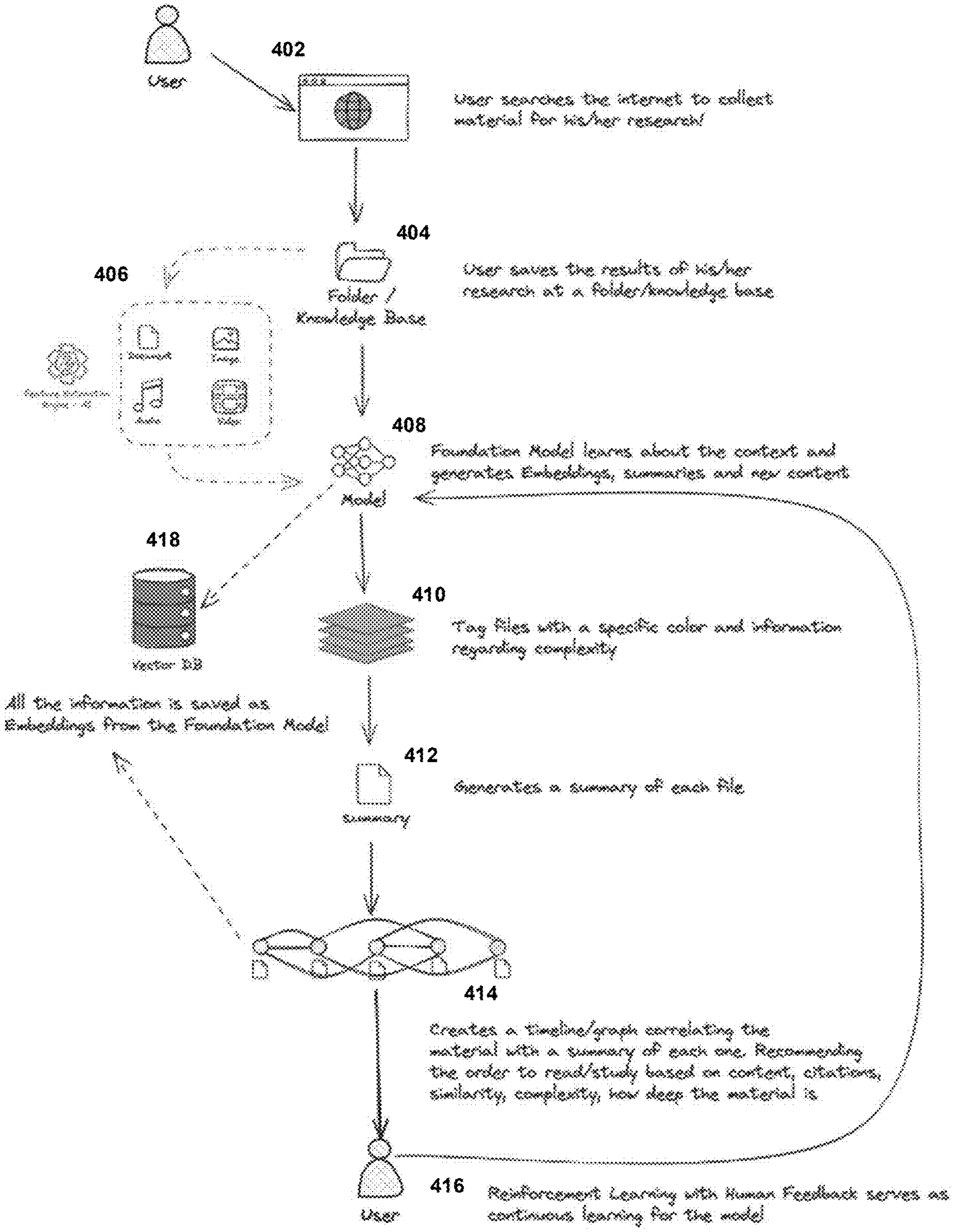
FIG. 4 illustrates a flow diagram of an example computer implemented method that can facilitate automated learning plan creation using multi-modal materials in accordance with some embodiments described herein.

Next, FIG. 4 illustrates a flow diagram of an example computer implemented method 400 that can facilitate automated learning plan creation using multi-modal materials in accordance with some embodiments described herein.

The flow diagram 400 starts by collecting 402 relevant documents and media. The user can collect documents and media from the internet, including text files, images, audio recordings, videos, and other multimedia content related to the topic of interest. This step can involve gathering a wide range of materials that will serve as the foundation for the learning plan. The user can download the collected materials to a designated folder, which can be used as the knowledge base for the specific subject. This folder can act as the central location for all the gathered materials, making it easy for the system to access and process them.

The flow diagram 400 continues by adding 404 the collected media to the knowledge base. The user can add the collected media to a designated folder that serves as the knowledge base for the specific subject. The system can acknowledge the addition of new materials and prepare them for processing. This step can involve organizing the collected materials in a structured manner, making them easily accessible and manageable. The system can update its internal database to reflect the new additions, ensuring that all the materials are accounted for and ready for subsequent analysis.

The flow diagram 400 continues by performing 406 feature engineering on the collected documents and media. The system can initiate the feature engineering process to extract relevant features from each document based on their type. For text documents, the system can extract features such as bag-of-words representation and sentiment analysis. For images, the system can extract features such as object detection and image classification. For audio files, the system can extract features such as speech recognition and audio classification. The system can also perform necessary transformations, including text preprocessing, image resizing, and audio noise reduction, to ensure that the features are accurate and reliable. Additionally, the system can extract metadata, including creation date and author, to provide context for the materials.

The flow diagram 400 continues by performing 408 large multi-modal model analysis. The system can employ a Large Multi-Modal Model to analyze each media item. This model can be trained on a vast amount of data and can extract key information from various media types. The analysis can include generating summarizations, identifying entities, and detecting topics within each document, providing a deep understanding of the content. This analysis can be essential in identifying the most important concepts and relationships within the collected materials, which can be used to build a structured learning plan.

The flow diagram 400 continues by categorizing and tagging 410 the obtained media files. Based on the information extracted by the M L model, the system can categorize and tag the files according to their complexity, length, or target audience. The system can assign labels to each document, such as “technical” or “simple”, “long” or “short”, and “general” or “specific”. These labels can be used to recommend a personalized learning path for the user, taking into account their individual needs and preferences.

The flow diagram 400 continues by generating 412 a summary for each file. The system can generate a concise overview of the content based on the extracted key information. This summary can provide the user with a quick understanding of the main concepts and ideas, helping them to grasp the core content efficiently. The generated summaries can serve as contextual guides, helping users understand the relationships between different materials and concepts within the learning plan.

The flow diagram 400 continues by generating 414 a graph that displays the determined chronological order in which the material should be consumed. This graph can be based on the analysis of the materials, considering factors such as citations, difficulty, and publication time. The graph can be represented as a mind map-like dashboard, providing a visual representation of the learning plan. This interactive dashboard can guide the user through the learning process, recommending the most effective order for consuming the materials.

The flow diagram 400 continues by incorporating 416 continuous feedback and reinforcement learning. The system can include a continuous feedback loop to improve its performance and adapt to the user’s needs. A s the user interacts with the learning plan, the system can collect feedback in the form of ratings, comments, and usage metrics. The collected feedback can be used to update the model and adjust the learning plan in real time. The system can employ reinforcement learning techniques, such as Q-learning or policy gradient methods, to optimize its performance, aiming to maximize the user’s engagement and learning outcomes while minimizing the time spent on the learning plan. The reinforcement learning agent can receive rewards or penalties based on the user’s feedback and can adjust its strategy accordingly, using metrics such as user engagement, learning outcomes, and system performance to inform its decisions.

The flow diagram 400 concludes by utilizing 418 a vector database for storage. The system can store all the processed information as embeddings in a vector database. This database can be optimized for fast querying and retrieval, enabling the system to quickly access and analyze the stored materials. The vector database can provide a compact and efficient way to store complex relationships between the materials, allowing the system to scale and manage large volumes of data efficiently.

Figure 5:
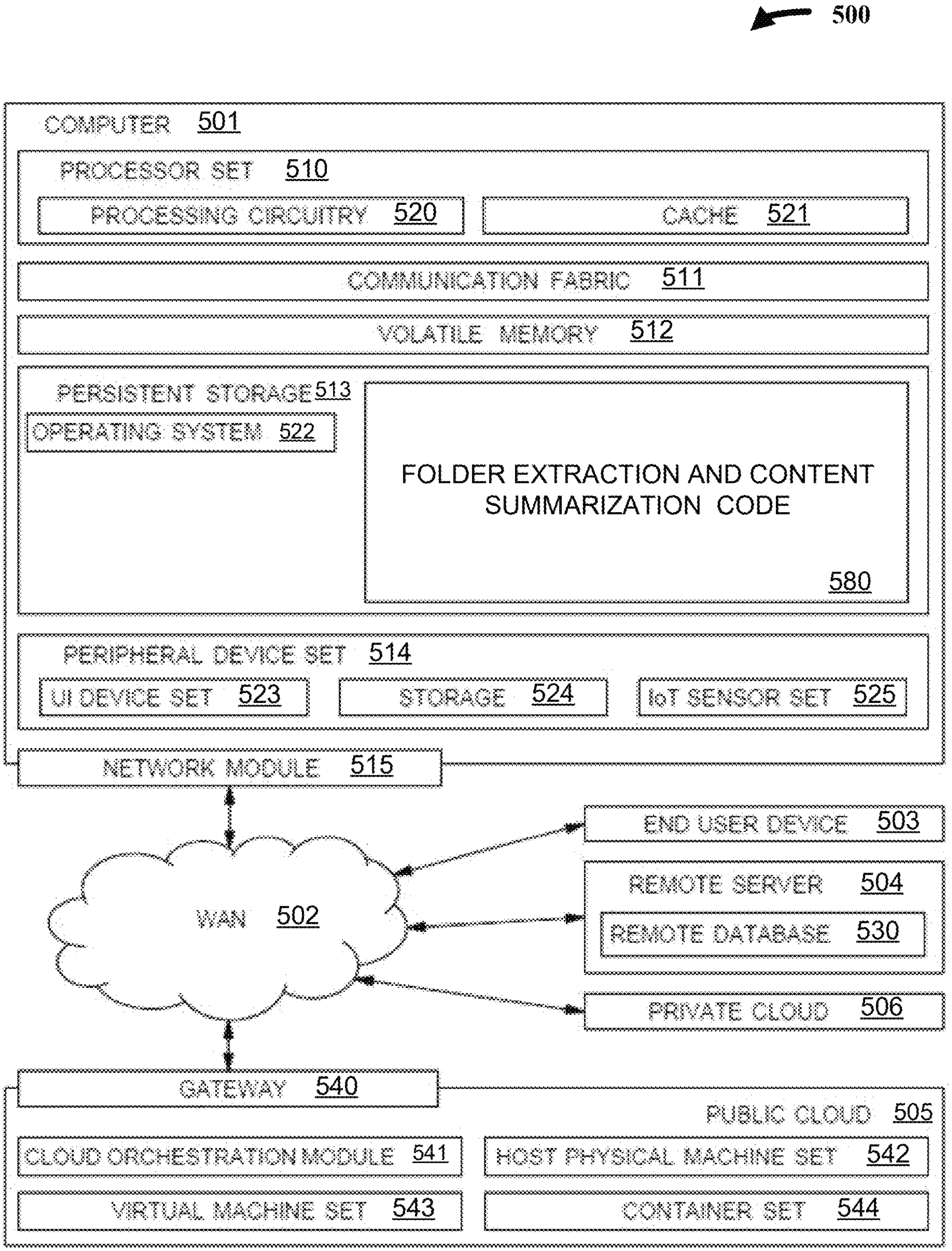
FIG. 5 illustrates a block diagram of an example computing environment in which some embodiments described herein can be facilitated.

FIG. 5 and the following discussion are intended to provide a brief, general description of a suitable computing environment 500 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as iteratively updating the preliminary recovery plan until a failure-free recovery plan is developed with folder extraction and content summarization code 580. In addition to block 580, computing environment 500 includes, for example, computer 501, wide area network (WAN) 502, end user device (EUD) 503, remote server 504, public cloud 505, and private cloud 506. In this embodiment, computer 501 includes processor set 514 (including processing circuitry 520 and cache 521), communication fabric 511, volatile memory 512, persistent storage 513 (including operating system 522 and block 545, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. A s is well understood in the art of computer technology, and depending upon the technology, performance of a computer-implemented method can be distributed among multiple computers and/or between multiple locations. On the other hand, in this presentation of computing environment 500, detailed discussion is focused on a single computer, specifically computer 501, to keep the presentation as simple as possible. Computer 501 can be located in a cloud, even though it is not shown in a cloud in FIG. 5. On the other hand, computer 501 is not required to be in a cloud except to any extent as can be affirmatively indicated.

PROCESSOR SET 510 includes one, or more, computer processors of any type now known or to be developed in the future. Processing circuitry 520 can be distributed over multiple packages, for example, multiple, coordinated integrated circuit chips. Processing circuitry 520 can implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set can be located "off chip." In some computing environments, processor set 510 can be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods can be stored in block 545 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory can be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 can be a read only memory (ROM), but typically at least a portion of the persistent storage allows writing of data, deletion of data and re-writing of data. Some familiar forms of persistent storage include magnetic disks and solid-state storage devices. Operating system 522 can take several forms, such as various known proprietary operating systems or open-source Portable Operating System Interface type operating systems that employ a kernel. The code included in block 545 typically includes at least some of the computer code involved in performing the inventive methods.

PERIPHERAL DEVICE SET 514 includes the set of peripheral devices of computer 501. Data communication connections between the peripheral devices and the other components of computer 501 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 can include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 can be persistent and/or volatile. In some embodiments, storage 524 can take the form of a quantum computing storage device for storing data in the form of qubits. In embodiments where computer 501 is required to have a large amount of storage (for example, where computer 501 locally stores and manages a large database) then this storage can be provided by peripheral storage devices designed for storing large amounts of data, such as a storage area network (SAN) that is shared by multiple, geographically distributed computers. IoT sensor set 525 is made up of sensors that can be used in Internet of Things applications. For example, one sensor can be a thermometer, and another sensor can be a motion detector.

NETWORK MODULE 515 is the collection of computer software, hardware, and firmware that allows computer 501 to communicate with other computers through WAN 502. Network module 515 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501) and can take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 can be a client device, such as thin client, heavy client, mainframe computer and/or desktop computer.

REMOTE SERVER 504 is any computer system that serves at least some data and/or functionality to computer 501. Remote server 504 can be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data can be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs can be stored as images and can be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware and firmware allowing public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LA N) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to some embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms “component,” “system,” “platform” and/or “interface” can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. A s yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in the subject specification and annexed drawings should generally be construed to mean “one or more” unless specified otherwise or clear from context to be directed to a singular form. As used herein, the terms “example” and/or “exemplary” are utilized to mean serving as an example, instance, or illustration. For the avoidance of doubt, the subject matter described herein is not limited by such examples. In addition, any aspect or design described herein as an “example” and/or “exemplary” is not necessarily to be construed as preferred or advantageous over other aspects or designs, nor is it meant to preclude equivalent exemplary structures and techniques known to those of ordinary skill in the art.

As it is employed in the subject specification, the term “processor” can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as “store,” “storage,” “data store,” data storage,” “database,” and substantially any other information storage component relevant to operation and functionality of a component are utilized to refer to “memory components,” entities embodied in a “memory,” or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. M any modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a processor that executes computer executable components stored in memory, wherein the computer executable components comprise:

a user input component that receives input from a user pertaining to a subject of interest;

a collection component that obtains media files pertaining to the subject of interest for the user, and populates a knowledge base with the obtained media files;

an extraction component that determines a type of media for each of the obtained media files and extracts relevant features and metadata from each of the obtained media files, based on the determined media type of each of the obtained media files, wherein the extraction component utilizes media-type-specific feature extraction pipelines including extracting bag-of-words representations or sentiment analysis for text documents, performing object detection or classification for image files, or performing speech recognition or audio classification for audio files;

an analysis component that utilizes a large language model to extract key information from the obtained media files and to generate embeddings representing content of the obtained media files;

a data component that stores the embeddings in a vector database configured to enable comparison of the obtained media files based on the embeddings;

a categorization component that categorizes and tags the obtained media files based on complexity, length, or target audience of the obtained media files;

a summarization component that generates a summary of each of the obtained media files, based on the extracted key information;

a generation component that determines relationships between the obtained media files based on the extracted key information and the embeddings, and determines a chronological order of the obtained media files to be reviewed by a user, based on the generated summary, the extracted key information, and the determined relationships, and generates a graph displaying the determined chronological order; and a feedback component that receives feedback from a user and updates the determined chronological order and graph, based on the received feedback.

2. The system of claim 1, wherein the media further comprise at least one of documents, text, images, audio, or video.

3. The system of claim 1, wherein the extraction component utilizes a feature engineering module to extract features specific to the type of media.

4. The system of claim 3, wherein the extraction component extracts bag-of-words representation and sentiment analysis for text documents, object detection and classification for images, or speech recognition and audio classification for audio files.

5. The system of claim 3, wherein the extraction component applies text preprocessing, image resizing, or audio noise reduction to improve accuracy and reliability of extracted features.

6. The system of claim 1, wherein the analysis component employs a large multi-modal model trained on diverse data sources to extract summarizations, entities, and topics from the obtained media files.

7. The system of claim 6, wherein the analysis component uses the extracted entities and topics to determine relationships between the media files.

8. The system of claim 1, wherein the categorization component assigns metadata-based labels to the media files.

9. The system of claim 8, wherein the metadata-based labels further comprise a complexity level, a length, or a target audience.

10. The system of claim 9, wherein the metadata further comprises a creation date, author, or reference to related materials.

11. The system of claim 1, wherein the generation component further determines the chronological order of files based on a document citation, difficulty level, or publication time of a file.

12. The system of claim 1, wherein the feedback component collects user input in the form of ratings, comments, or interaction metrics to refine the chronological order, and updates the knowledge base based on the collected user input.

13. The system of claim 1, wherein the feedback component employs reinforcement learning techniques to optimize the chronological order based on user engagement or learning outcomes.

14. The system of claim 1, further comprising a data component that utilizes a vector database to store embeddings of extracted features, metadata, or user interactions.

15. The system of claim 1, further comprising an artificial intelligence component that analyses progress of a user and updates the chronological order based on the user progress.

16. A computer-implemented method that utilizes a processor that executes computer executable components stored in memory to perform the following acts:

receiving input from a user pertaining to a subject of interest;

obtaining media files pertaining to the subject of interest;

populating a knowledge base with the obtained media files;

determining a type of media for each of the obtained media files;

extracting relevant features and metadata from each of the obtained media files, based on the determined media type of each of the obtained media files, wherein extracting the relevant features and metadata comprises utilizing media-type-specific feature extraction pipelines including extracting bag-of-words representations or sentiment analysis for text documents, performing object detection or classification for image files, or performing speech recognition or audio classification for audio files;

utilizing a large language model to extract key information from the obtained media files and to generate embeddings representing content of the obtained media files;

storing the embeddings in a vector database configured to enable comparison of the obtained media files based on the embeddings;

categorizing and tagging the obtained media files based on complexity, length, or target audience of the obtained media files;

generating a summary of each of the obtained media files based on the extracted key information;

determining relationships between the obtained media files based on the extracted key information and the embeddings;

determining a chronological order of the obtained media files to be reviewed by a user, based on the generated summary, the extracted key information, and the determined relationships;

generating a graph displaying the determined chronological order;

receiving feedback from a user; and updating the determined chronological order and graph, based on the received feedback.

17. The computer-implemented method of claim 16, further comprising applying text preprocessing, image resizing, or audio noise reduction to improve accuracy and reliability of the extracted features.

18. The computer-implemented method of claim 16, wherein utilizing a large language model to extract key information further comprises analyzing each media file to identify summarizations, entities, or topics.

19. The computer-implemented method of claim 16, further comprising categorizing and tagging the obtained media files by assigning metadata-based labels.

20. A computer program product comprising a computer readable storage medium having program instructions embodied therewith, the program instructions executable by a processor to cause the processor to:

receive input from a user pertaining to a subject of interest;

obtain media files pertaining to the subject of interest;

populate a knowledge base with the obtained media files;

determine a type of media for each of the obtained media files;

extract relevant features and metadata from each of the obtained media files, based on the determined media type of the each of the obtained media files, wherein extracting the relevant features and metadata comprises utilizing media-type-specific feature extraction pipelines including extracting bag-of-words representations or sentiment analysis for text documents, performing object detection or classification for image files, or performing speech recognition or audio classification for audio files;

utilize a large language model to extract key information from the obtained media files, and to generate embeddings representing content of the obtained media files;

store the embeddings in a vector database configured to enable comparison of the obtained media files based on the embeddings;

categorize and tag the obtained media files based on complexity, length, or target audience of the obtained media files;

summarize each of the obtained media files based on the extracted key information;

determine relationships between the obtained media files based on the extracted key information and the embeddings;

determine a chronological order of the obtained media files to be reviewed by a user, based on the generated summary, the extracted key information, and the determined relationships;

generate a graph displaying the determined chronological order;

receive feedback from a user; and update the determined chronological order and graph, based on the received feedback.

* * * * *